US008595682B2

(12) United States Patent
Byrne et al.

(10) Patent No.: US 8,595,682 B2
(45) Date of Patent: Nov. 26, 2013

(54) PHASE COMPENSATION IN A DIFFERENTIAL PAIR OF TRANSMISSION LINES (75) Inventors: William T. Byrne, Raleigh, NC (US); Robert J. Christopher, Chapel Hill, NC (US); Paul D. Kangas, Raleigh, NC (US); Pravin S. Patel, Cary, NC (US); Daniel M. Ranck, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/330,368

(22) Filed: Dec. 19, 2011

(65) Prior Publication Data

US 2013/0159959 A1 Jun. 20, 2013

(51) Int. Cl.
G06F 17/50 (2006.01)
(52) U.S. Cl.
USPC .......... 716/137; 716/110; 716/115; 716/126; 716/130
(58) Field of Classification Search
USPC ......... 716/110–113, 115, 126, 130, 132, 134, 716/136–137
See application file for complete search history.

(56) References Cited

U.S. PATENT DOCUMENTS

| 2,705,777 | A | | 4/1955 | Denis |
| 3,286,260 | A | | 11/1966 | Howard |
| 5,606,286 | A | | 2/1997 | Bains |
| 5,757,654 | A | * | 5/1998 | Appel .......................... 716/100 |
| 6,486,750 | B1 | | 11/2002 | Disch |
| 6,525,627 | B2 | | 2/2003 | Nakada |
| 6,541,759 | B1 | * | 4/2003 | Hill .......................... 250/227.27 |
| 6,552,804 | B2 | * | 4/2003 | Hill .............................. 356/510 |
| 7,145,418 | B2 | | 12/2006 | Akale et al. |
| 7,643,018 | B1 | | 1/2010 | Brown et al. |
| 2008/0084726 | A1 | * | 4/2008 | Yamauchi ...................... 365/51 |
| 2009/0192729 | A1 | | 7/2009 | Pado et al. |
| 2009/0315158 | A1 | | 12/2009 | Maetani |
| 2011/0225561 | A1 | * | 9/2011 | Orita et al. .................... 716/131 |

FOREIGN PATENT DOCUMENTS

JP 2000031865 A 1/2000

OTHER PUBLICATIONS

Li et al., "Design of a 1x20 Series Feed Network With Composite Right/Left-Handed Transmission Line", Journal: Progress in Electromagnetics Research (PIER), 2009, pp. 311-324, vol. 89, MIT Press, USA.

* cited by examiner

Primary Examiner — Stacy Whitmore
(74) Attorney, Agent, or Firm — H. Barrett Spraggins; Katherine S. Brown; Biggers Kennedy Lenart Spraggins LLP (57) ABSTRACT Phase compensation in a differential pair of transmission lines, including: identifying, by a phase compensation module, a plurality of direction changes in the differential pair of transmission lines; determining, by the phase compensation module for each direction change in the differential pair of transmission lines, a direction change angle; and determining, by the phase compensation module for each direction change in the differential pair of transmission lines, the geometry of one or more phase correction humps to include in one transmission line of the differential pair of transmission lines in dependence upon the direction change angle.

15 Claims, 6 Drawing Sheets

PHASE COMPENSATION IN A DIFFERENTIAL PAIR OF TRANSMISSION LINES

BACKGROUND OF THE INVENTION

1. Field of the Invention

The field of the invention is data processing, or, more specifically, methods, apparatus, and products for phase compensation in a differential pair of transmission lines.

2. Description of Related Art

High speed transmission lines for differential pair signaling require equal length lines in the pair to maintain good signal quality. As the pair of lines bends and turns the inner and outer lines become shorter or longer relative to the other line. In order to address this problem, a serpentined section can be added to the shorter line of the pair to add length to the shorter line. The serpentined section is usually longer than the distance spanned by the rising/falling edges of the signal that propagates down the differential pair. This, in turn, exacerbates impedance discontinuity presented by the serpentined section and results in degraded signal quality. Furthermore, "all-in-one-place" correction of phase mismatches worsens mode conversion of differential to common-mode energy which also degrades signal quality.

SUMMARY OF THE INVENTION

Methods, systems, and apparatus for phase compensation in a differential pair of transmission lines, including: identifying, by a phase compensation module, a plurality of direction changes in the differential pair of transmission lines; determining, by the phase compensation module for each direction change in the differential pair of transmission lines, a direction change angle; and determining, by the phase compensation module for each direction change in the differential pair of transmission lines, the geometry of one or more phase correction humps to include in one transmission line of the differential pair of transmission lines in dependence upon the direction change angle.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
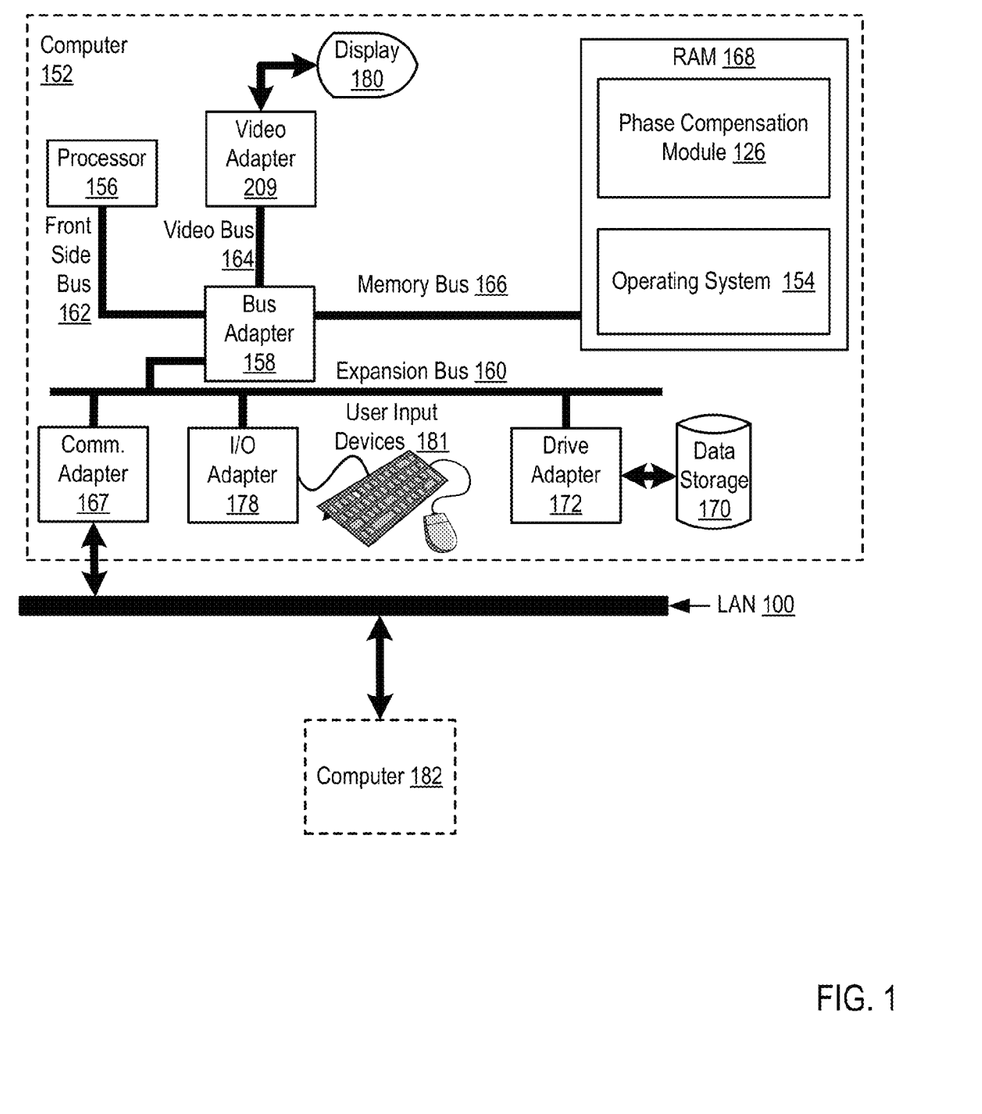
FIG. 1 sets forth a block diagram of automated computing machinery comprising an example computer useful in phase compensation in a differential pair of transmission lines according to embodiments of the present invention.

Example methods, apparatus, and products for phase compensation in a differential pair of transmission lines in accordance with the present invention are described with reference to the accompanying drawings, beginning with FIG. 1. FIG. 1 sets forth a block diagram of automated computing machinery comprising an example computer (152) useful in phase compensation in a differential pair of transmission lines according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a phase compensation module (126), a module of computer program instructions improved for phase compensation in a differential pair of transmission lines according to embodiments of the present invention. The phase compensation module (126) of FIG. 1 is configured to identify a plurality of direction changes in the differential pair of transmission lines. A direction change in the differential pair of transmission lines represents a bend or turn in the differential pair of transmission lines. The phase compensation module (126) of FIG. 1 may identify a plurality of direction changes in the differential pair of transmission lines, for example, by tracking the angular coordinates of a segment of the differential pair of transmission lines and checking for changes to the angular coordinates of a nearby segment of the differential pair of transmission lines.

The phase compensation module (126) of FIG. 1 is further configured to determine, for each direction change in the differential pair of transmission lines, a direction change angle. Determining a direction change angle may be carried out, for example, by determining the angle between the first direction of the differential pair of transmission lines and the second direction of the differential pair of transmission lines, as specified by the angular coordinates or other data identifying the direction of the respective segments.

The phase compensation module (126) of FIG. 1 is also configured to determine, for each direction change in the differential pair of transmission lines, the geometry of one or more phase correction humps to include in one transmission line of the differential pair of transmission lines in dependence upon the direction change angle. In the example of FIG. 1, a phase correction hump is a segment of a transmission line that is designed to lengthen the transmission line. Phase correction humps will be described and illustrated in greater detail in subsequent figures. In the example of FIG. 1, the 'geometry' of a phase correction hump not only refers to the physical shape and dimensions of a phase correction hump, but also to the location of the phase correction hump on t transmission line of the differential pair, the number of phase corrections humps to include, and so on. Determining the geometry of one or more phase correction humps to include in one transmission line of the differential pair of transmission lines in dependence upon the direction change angle can be carried out, for example, by determining the length differential between transmission lines in the differential pair and selecting a geometry of one or more phase correction humps to include in one transmission line of the differential pair of transmission lines to compensate for the length differential between transmission lines in the differential pair.

Also stored in RAM (168) is an operating system (154). Operating systems useful phase compensation in a differential pair of transmission lines according to embodiments of the present invention include UNIX™, Linux™, Microsoft XP™, AIX™, IBM's i5/OS™, and others as will occur to those of skill in the art. The operating system (154) and phase compensation module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for phase compensation in a differential pair of transmission lines according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for phase compensation in a differential pair of transmission lines according to embodiments of the present invention include modems for wired dial-up communications, Ethernet (IEEE 802.3) adapters for wired data communications network communications, and 802.11 adapters for wireless data communications network communications.

Figure 2A:
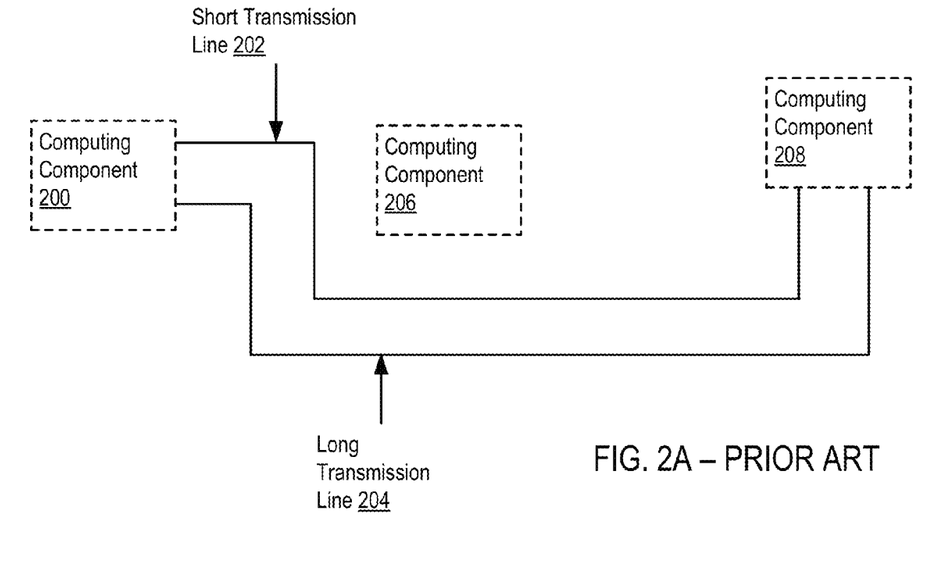
FIG. 2A sets forth a block diagram of a differential pair of transmission lines that connect two computing components.

For further explanation, FIG. 2A sets forth a block diagram of a differential pair of transmission lines (202, 204) that connect two computing components (200, 208). In the example of FIG. 2A, the transmission lines (202, 204) may be embodied, for example, as a trace on a printed circuit board ('PCB'). The transmission lines (202, 204) of the differential pair may be utilized to transmit electrical signals between the two computing components (200, 208) that are connected by the differential pair. In the example of FIG. 2A, because the transmission lines (202, 204) form a differential pair, the transmission lines (202, 204) may be used for differential signaling in which electrical information is exchanged by sending complimentary signals over each of the transmission lines (202, 204). In such an example, a higher voltage on one path represents a particular logical value while a higher voltage on the other path represents a different logical value, such as a logical '0' or logical '1.'

In the example of FIG. 2A, the transmission lines (202, 204) must be routed around another computing component (206). The example depicted in FIG. 2A is especially common in the context of a PCB, as traces frequently must be routed around the other computing components that are mounted on the PCB. In such an example, the routing of the transmission lines (202, 204) around other computing components (206) may cause each transmission line (202, 204) to be of a different length. In FIG. 2A, one transmission line is the short transmission line (202) while the other transmission line is the long transmission line (204). As such, the distance that an electrical signal must travel when the signal is carried over the long transmission line (204) is greater than the distance that an electrical signal must travel when the signal is carried over the short transmission line (202), thereby creating the opportunity for the electrical signals to become out-of-phase. In order to address out-of-phase signals, the length of the shorter path (202) may be extended to match the length of the longer path (204) within a certain tolerance. For example, the length of the shorter path (202) may be extended to match the length of the longer path (204) by including 'serpentine segments' into the shorter path (202).

Figure 2B:
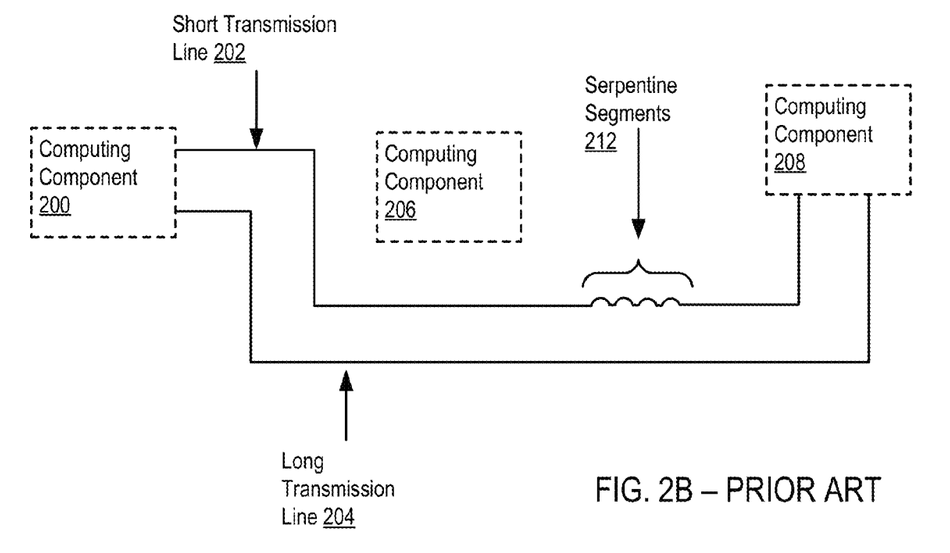
FIG. 2B sets forth a block diagram of a differential pair of transmission lines that connect two computing components.

For further explanation, FIG. 2B sets forth a block diagram of a differential pair of transmission lines (202, 204) that connect two computing components (200, 208). The example of FIG. 2B is similar to the example of FIG. 2A, although the computing component (206) that the transmission lines (202, 204) must be routed around is not depicted in FIG. 2B. In the example of FIG. 2B, however, the short path (202) has been altered to include serpentine segments (212) designed to add additional length to the short path (202). The serpentine segments (212) may be embodied, for example, as a part of the trace the forms the transmission line (202) with a geometry that causes the length of the short path (202) to be the same as the length of the long path (204) within an acceptable tolerance. Through the use of serpentine segments (212) the length of the shorter path (202) may be extended to match the length of the longer path (204) such that signals sent over each path (202, 204) can remain in phase.

Figure 3:
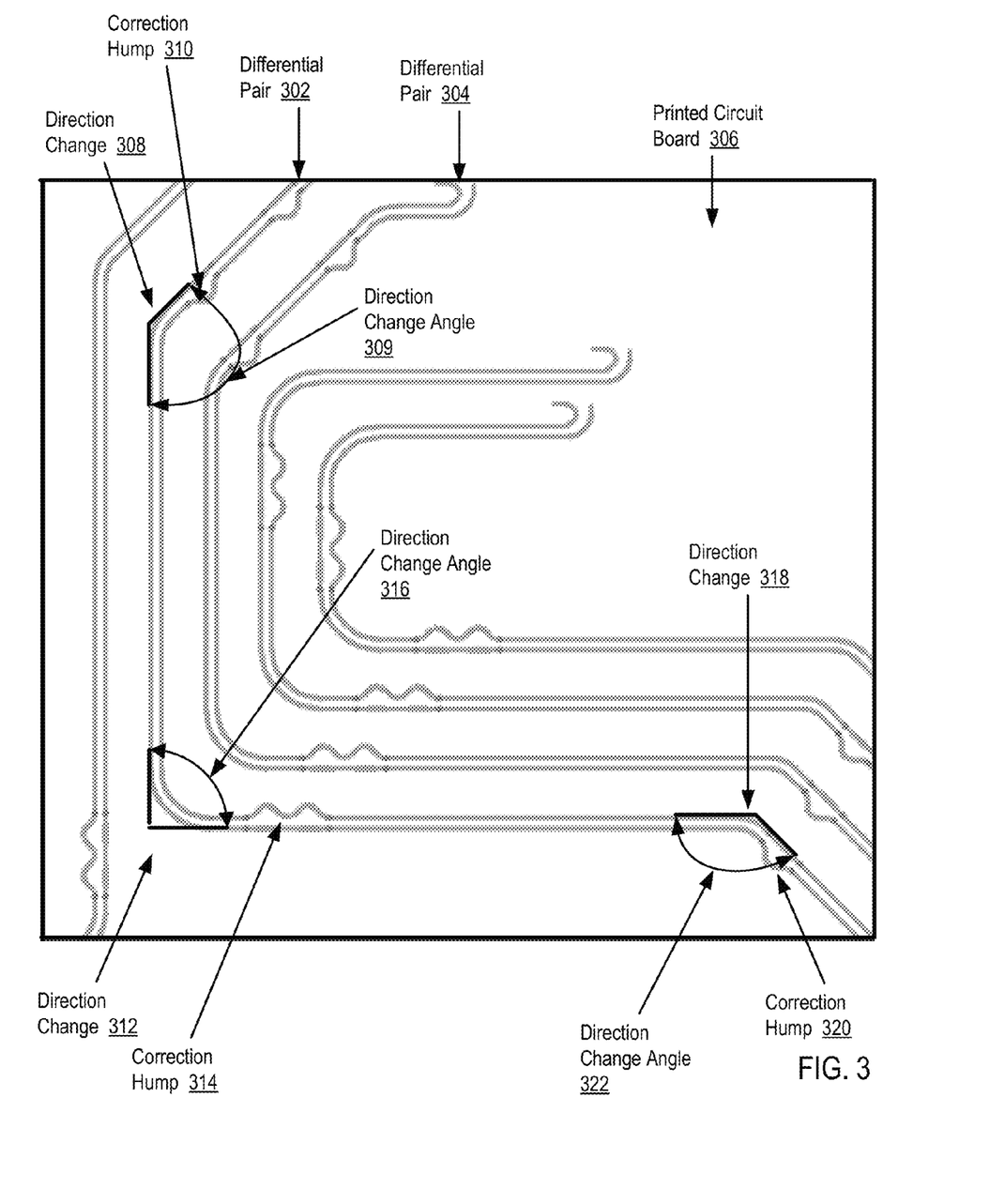
FIG. 3 sets forth a diagram of a printed circuit board according to embodiments of the present invention.

In the example of FIG. 2B, differential impedance across a differential pair is, in part, a function of the distance between the two signal lines of the differential pair. The inclusion of the serpentine segments (212) on the short path (202) therefore causes the differential impedance across the differential pair of transmission lines (202, 204) to be non-uniform. Furthermore, the distance of the serpentine segments (212) is usually longer than the distance spanned by the rising and falling edges of a signal that propagates down the differential pair of transmission lines (202, 204), thereby exacerbating the impedance discontinuity presented by the serpentine segments (212) and resulting in degraded signal quality. In addition, an "all-in-one-place" correction of phase mismatches worsens mode conversion of differential to common-mode energy which also degrades signal quality. FIG. 3 sets forth a solution to this problem.

For further explanation, FIG. 3 sets forth a block diagram of a PCB (316) according to embodiments of the present invention. The PCB (316) of FIG. 3 includes differential pairs (302, 304) of transmission lines. In the example of FIG. 3, each differential pair (302, 304) of transmission lines may be embodied, for example, as traces on the PCB for carrying signals between one or more computing components.

The first differential pair (302) of transmission lines includes three direction changes (308, 312, 318) during which the path of the differential pair (302, 304) of transmission lines changes. Each direction change (308, 312, 318) is characterized by a direction change angle (309, 316, 318) that can specify the degree to which the path of the differential pair (302) of transmission lines changes. As a result of the direction change (308, 312, 318), the length of the transmission lines that comprise the differential pair (302) is not uniform. In order to make the length of the transmission lines that comprise the differential pair (302) is uniform, so that signals traveling down each transmission line can remain in phase, one or more phase correction humps (310, 314, 320) are added to the shorter of the two transmission lines.

Figure 4:
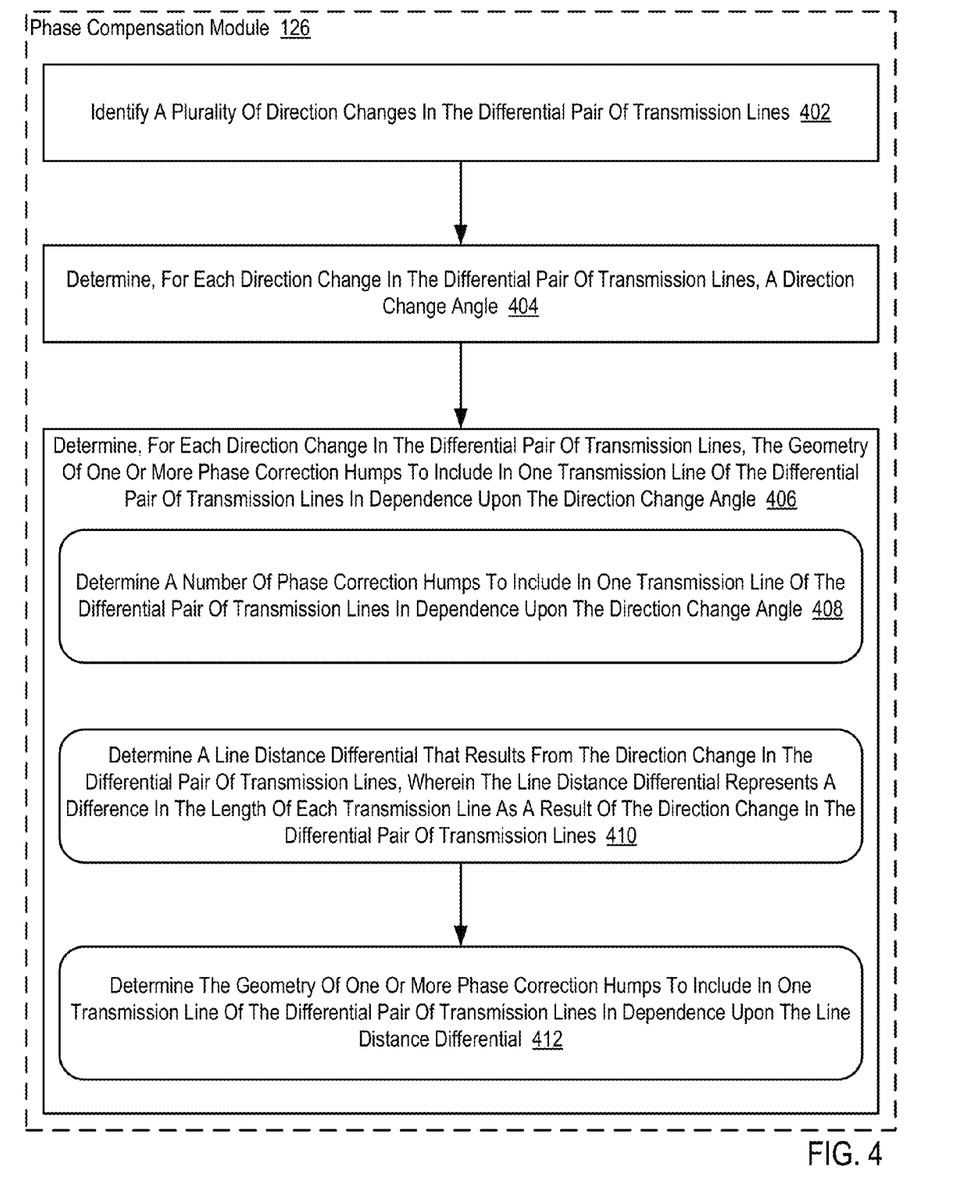
FIG. 4 sets forth a flow chart illustrating an example method for phase compensation in a differential pair of transmission lines according to embodiments of the present invention.

For further explanation, FIG. 4 sets forth a flow chart illustrating an example method for phase compensation in a differential pair of transmission lines according to embodiments of the present invention. The example method of FIG. 4 includes identifying (402), by a phase compensation module (126), a plurality of direction changes in the differential pair of transmission lines. In the example method of FIG. 4, the phase compensation module (126) may be embodied as a module of computer program instructions that, when executed, are used to alter the design of the differential pair of transmission lines to achieve a design that maximizes signal quality. Such a phase compensation module (126) may be included, for example, in a circuit design application and used to design the layout of traces as part of a circuit, printed circuit board, and so on.

The phase compensation module (126) of FIG. 4 is configured to identify (402) a plurality of direction changes in the differential pair of transmission lines. In the example method of FIG. 4, a direction change in the differential pair of transmission lines represents a bend or turn in the differential pair of transmission lines. The phase compensation module (126) of FIG. 4 may identify (402) a plurality of direction changes in the differential pair of transmission lines, for example, by tracking the angular coordinates of a segment of the differential pair of transmission lines and checking for changes to the angular coordinates of a nearby segment of the differential pair of transmission lines. For example, the phase compensation module (126) may begin tracking the angular coordinates of a segment of the differential pair of transmission lines that represents an endpoint of the differential pair. The phase compensation module (126) may subsequently traverse the remainder of the differential pair of transmission lines, in predetermined segment lengths, and track the angular coordinates of each subsequent segment so as to identify changes in the angular coordinates of neighboring segments. Although the example described above uses angular coordinates to identify (402) a plurality of direction changes in the differential pair of transmission lines, readers will appreciate that any coordinate sets or other indicia of direction can be used according to embodiments of the present invention.

The example method of FIG. 4 also includes determining (404), by the phase compensation module (126) for each direction change in the differential pair of transmission lines, a direction change angle. Determining (404) a direction change angle may be carried out, for example, by determining the angle between the first direction of the differential pair of transmission lines and the second direction of the differential pair of transmission lines, as specified by the angular coordinates or other data identifying the direction of the respective segments.

The example method of FIG. 4 also includes determining (406), by the phase compensation module (126) for each direction change in the differential pair of transmission lines, the geometry of one or more phase correction humps to include in one transmission line of the differential pair of transmission lines in dependence upon the direction change angle. In the example method of FIG. 4, determining (406) the geometry of one or more phase correction humps to include in one transmission line of the differential pair of transmission lines in dependence upon the direction change angle can be carried out, for example, by determining the length differential between transmission lines in the differential pair and selecting a geometry of one or more phase correction humps to include in one transmission line of the differential pair of transmission lines to compensate for the length differential between transmission lines in the differential pair.

In the example method FIG. 4, determining (406) the geometry of one or more phase correction humps to include in one transmission line of the differential pair of transmission lines in dependence upon the direction change angle can include determining (408) a number of phase correction humps to include in one transmission line of the differential pair of transmission lines in dependence upon the direction change angle. In the example method of FIG. 4, the direction change angle may be associated with a particular number of phase correction humps to include in one transmission line of the differential pair of transmission lines. For example, a rule set may specify that if the direction change angle 45 degrees then one phase correction hump is required while the same rule set further specifies that if the direction change angle 90 degrees then two phase correction humps are required. In such an example, the geometry of each phase correction hump can be set such that the one or more phase correction humps compensate for the length differential between transmission lines in the differential pair.

Alternatively, each phase correction hump may be of a particular geometry such that each phase correction hump adds a predetermined amount of length to the transmission line that the phase correction hump is added to. In such an example, determining (408) a number of phase correction humps to include in one transmission line of the differential pair of transmission lines may be carried out determining the length differential between transmission lines in the differential pair, for example, using the direction change angle and the path separation distance as described above. Determining (408) a number of phase correction humps to include in one transmission line of the differential pair of transmission lines may subsequently be carried out by dividing the length differential between transmission lines in the differential pair by the length that is added to a transmission line by inclusion of one phase correction hump, such that the number of phase correction humps needed to compensate for the length differential between transmission lines in the differential pair is identified.

In the example method FIG. 4, determining (406) the geometry of one or more phase correction humps to include in one transmission line of the differential pair of transmission lines in dependence upon the direction change angle can alternatively include determining (410), by the phase compensation module, a line distance differential that results from the direction change in the differential pair of transmission lines. In the example method of FIG. 4, the line distance differential represents a difference in the length of each transmission line as a result of the direction change in the differential pair of transmission lines. Consider the example depicted in FIG. 5 of the present application.

The example of FIG. 4 describes determining (406) the geometry of one or more phase correction humps to include in one transmission line of the differential pair of transmission lines in dependence upon the direction change angle. Readers will appreciate, however, that other attributes of the differential pair of transmission lines may also be accounted for when determining (406) the geometry of one or more phase correction humps to include in one transmission line of the differential pair of transmission lines. For example, the width of each transmission line and the separation between each transmission line may also be taken into account when determining (406) the geometry of one or more phase correction humps to include in one transmission line of the differential pair of transmission lines. In such an example, the geometry of one or more phase correction humps to include in one transmission line of the differential pair of transmission lines may be stored in a data repository that includes combinations of direction change angles, line separations, path widths, and so on. Each combination of attributes describing the differential pair may be associated with a particular geometry of one or more phase correction humps, thereby forming a library of phase correction hump geometries to use with various attributes describing the differential pair.

Figure 5:
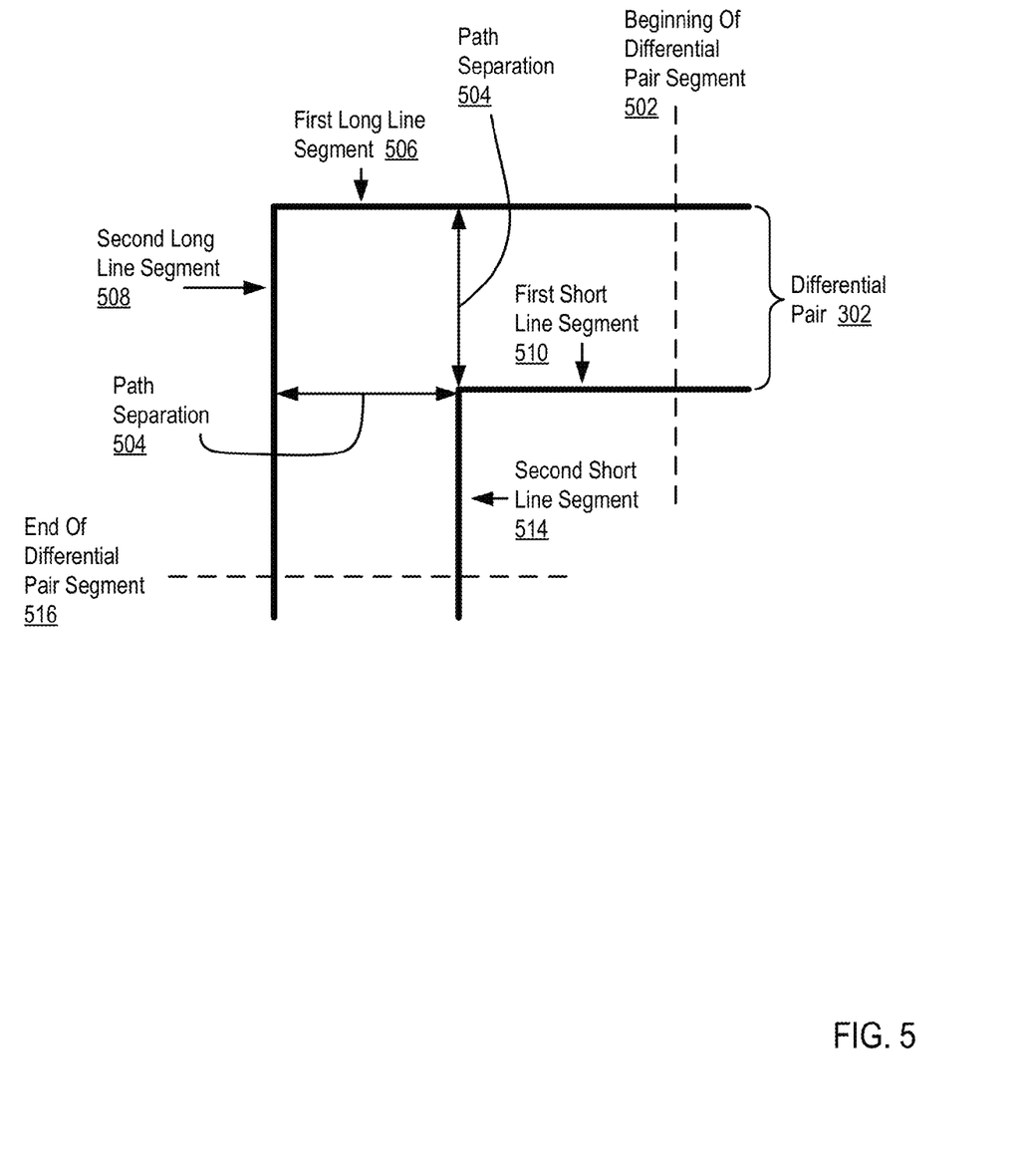
FIG. 5 sets forth a diagram of a segment of a differential pair of transmission lines that includes a change of direction according to embodiments of the present invention.

FIG. 5 sets forth a diagram of a segment of a differential pair (302) of transmission lines that includes a change of direction according to embodiments of the present invention. In the example of FIG. 5, the direction change angle is depicted as being 90 degrees. In such an example, once the direction change angle is identified as being 90 degrees, the length differential between transmission lines in the differential pair (302) can be calculated as being twice the path separation (504) of the transmission lines in the differential pair (302). That is, the length of the first long line segment (506) is greater than the length of the first short line segment (510) by a distance that is equal to the path separation (504) of the transmission lines in the differential pair (302). Furthermore, the length of the second long line segment (508) is also greater than the length of the second short line segment (514) by a distance that is equal to the path separation (504) of the transmission lines in the differential pair (302). As such, the length of the long line segment is greater than the length of the short line segment, between the beginning of the differential pair segment (502) and the end of the differential pair segment (516), by a distance that is equal to twice the path separation (504) of the transmission lines in the differential pair (302). In such an example, the geometry of one or more phase correction humps to include in one transmission line of the differential pair of transmission lines can be determined such that the one or more phase correction humps lengthen the short transmission line by a distance that is equal to twice the path separation (504) of the transmission lines in the differential pair (302).

Returning to FIG. 4, determining (406) the geometry of one or more phase correction humps to include in one transmission line of the differential pair of transmission lines in dependence upon the direction change angle can also include determining (412), by the compensation module (126), the geometry of one or more phase correction humps to include in one transmission line of the differential pair of transmission lines in dependence upon the line distance differential. Consider the example depicted in FIG. 6.

Figure 6:
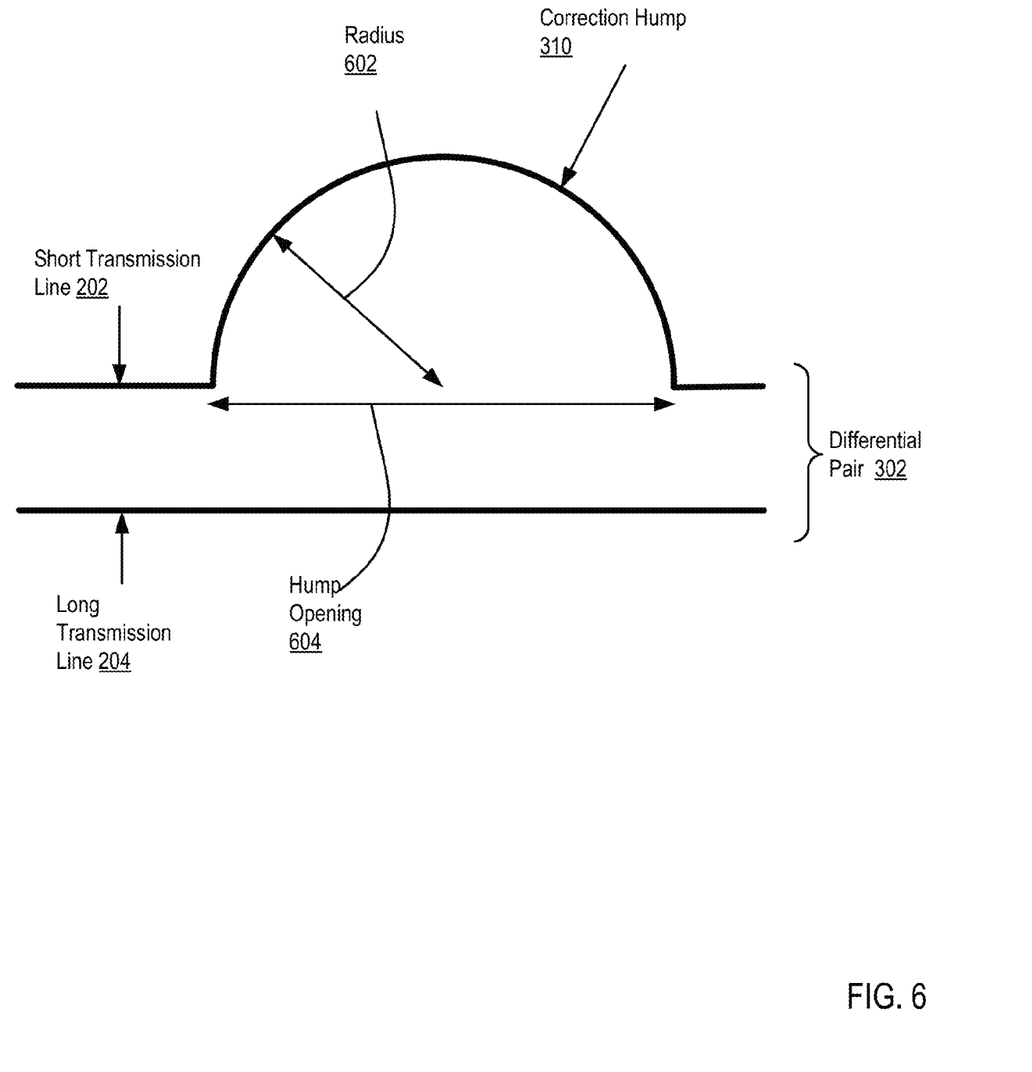
FIG. 6 sets forth a diagram of a segment of a differential pair of transmission lines that includes a phase correction hump according to embodiments of the present invention.

FIG. 6 sets forth a diagram of a segment of a differential pair (302) of transmission lines that includes a phase correction hump (310) according to embodiments of the present invention. In the example of FIG. 6, assume that the short transmission line (202) is shorter than the long transmission line (204) by a distance of D prior to the inclusion of any correction humps (310). Because the correction hump (310) adds an amount of distance to the short transmission line (202) that is equal to the length of the correction hump (310) minus the hump opening (604), the length of the correction hump (310) that is needed to compensate for the line distance differential between the two transmission lines (202, 204) can be determined by the following formula:

$$L_{ch} = D - L_{ho}$$

In the formula above, $L_{ch}$ represents the length of the correction hump that is needed to compensate for the line distance differential between the two transmission lines (202, 204), D represents the line distance differential between the two transmission lines (202, 204), and $L_{ho}$ represents the distance of the hump opening (604). In such an example, because the length of a semi-circle is equal to it multiplied by the radius (602) of the semi-circle $$R_{ch} = (D - L_{ho})/\pi$$

In the formula above, $R_{ch}$ is the radius of the correction hump (310). In such an example, because at least the values of D and π are known, the formula can be solved to determine the radius of a correction hump (310) and the length of the hump opening (604) that are needed to compensate for the line distance differential between the two transmission lines (202, 204).

The example of FIG. 6 describes phase correction humps that are semi-circles. Readers will appreciate that a phase correction hump shaped as a semi-circle is only one possible embodiment of the present invention. Phase correction humps may take many shapes, including humps composed of linear segments, curved segments, or any combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of phase compensation in a differential pair of transmission lines, the method comprising:
   identifying, by a phase compensation computer, a plurality of direction changes in the differential pair of transmission lines;
   determining, by the phase compensation computer for each direction change in the differential pair of transmission lines, a direction change angle; and
   determining, by the phase compensation computer for each direction change in the differential pair of transmission lines, the geometry of one or more phase correction humps to include in one transmission line of the differential pair of transmission lines in dependence upon the direction change angle.

2. The method of claim 1 wherein determining the geometry of one or more phase correction humps to include in one transmission line of the differential pair of transmission lines in dependence upon the direction change angle further comprises determining a number of phase correction humps to include in one transmission line of the differential pair of transmission lines in dependence upon the direction change angle.

3. The method of claim 1 wherein determining the geometry of one or more phase correction humps to include in one transmission line of the differential pair of transmission lines in dependence upon the direction change angle further comprises:
   determining, by the phase compensation computer, a line distance differential that results from the direction change in the differential pair of transmission lines, wherein the line distance differential represents a difference in the length of each transmission line as a result of the direction change in the differential pair of transmission lines; and
   determining, by the compensation computer, the geometry of one or more phase correction humps to include in one transmission line of the differential pair of transmission lines in dependence upon the line distance differential.

4. The method of claim 3 wherein the geometry of one or more phase correction humps to include in one transmission line of the differential pair compensates for the line distance differential within a predetermined threshold.

5. The method of claim 1 wherein the differential pair of transmission lines are traces on a printed circuit board.

6. An apparatus for phase compensation in a differential pair of transmission lines, the apparatus comprising a computer processor, a computer memory operatively coupled to the computer processor, the computer memory having disposed within it computer program instructions that, when executed by the computer processor, cause the apparatus to carry out the steps of:

identifying, by a phase compensation computer, a plurality of direction changes in the differential pair of transmission lines;

determining, by the phase compensation computer for each direction change in the differential pair of transmission lines, a direction change angle; and determining, by the phase compensation computer for each direction change in the differential pair of transmission lines, the geometry of one or more phase correction humps to include in one transmission line of the differential pair of transmission lines in dependence upon the direction change angle.

7. The apparatus of claim 6 wherein determining the geometry of one or more phase correction humps to include in one transmission line of the differential pair of transmission lines in dependence upon the direction change angle further comprises determining a number of phase correction humps to include in one transmission line of the differential pair of transmission lines in dependence upon the direction change angle.

8. The apparatus of claim 6 wherein determining the geometry of one or more phase correction humps to include in one transmission line of the differential pair of transmission lines in dependence upon the direction change angle further comprises:

determining, by the phase compensation computer, a line distance differential that results from the direction change in the differential pair of transmission lines, wherein the line distance differential represents a difference in the length of each transmission line as a result of the direction change in the differential pair of transmission lines; and determining, by the compensation computer, the geometry of one or more phase correction humps to include in one transmission line of the differential pair of transmission lines in dependence upon the line distance differential.

9. The apparatus of claim 8 wherein the geometry of one or more phase correction humps to include in one transmission line of the differential pair compensates for the line distance differential within a predetermined threshold.

10. The apparatus of claim 6 wherein the differential pair of transmission lines are traces on a printed circuit board.

11. A computer program product for phase compensation in a differential pair of transmission lines, the computer program product disposed upon a computer readable medium, wherein the computer readable medium is not a signal, the computer program product comprising computer program instructions that, when executed, cause a phase compensation computer to carry out the steps of:

identifying a plurality of direction changes in the differential pair of transmission lines;

determining for each direction change in the differential pair of transmission lines, a direction change angle; and determining for each direction change in the differential pair of transmission lines, the geometry of one or more phase correction humps to include in one transmission line of the differential pair of transmission lines in dependence upon the direction change angle.

12. The computer program product of claim 11 wherein determining the geometry of one or more phase correction humps to include in one transmission line of the differential pair of transmission lines in dependence upon the direction change angle further comprises determining a number of phase correction humps to include in one transmission line of the differential pair of transmission lines in dependence upon the direction change angle.

13. The computer program product of claim 11 wherein determining the geometry of one or more phase correction humps to include in one transmission line of the differential pair of transmission lines in dependence upon the direction change angle further comprises:

determining a line distance differential that results from the direction change in the differential pair of transmission lines, wherein the line distance differential represents a difference in the length of each transmission line as a result of the direction change in the differential pair of transmission lines; and determining the geometry of one or more phase correction humps to include in one transmission line of the differential pair of transmission lines in dependence upon the line distance differential.

14. The computer program product of claim 13 wherein the geometry of one or more phase correction humps to include in one transmission line of the differential pair compensates for the line distance differential within a predetermined threshold.

15. The computer program product of claim 11 wherein the differential pair of transmission lines are traces on a printed circuit board.

* * * * *